Patented Jan. 3, 1950

2,493,444

UNITED STATES PATENT OFFICE 2,493,444

METHOD FOR STABILIZING SULFATED PRODUCTS

John Randolph Clark, Nutley, and John David Malkemus, Allendale, N. J., assignors to Colgate-Palmolive-Peet Company, Jersey City, N. J., a corporation of Delaware No Drawing. Application July 1, 1946, Serial No. 680,853

13 Claims. (Cl. 260—400)

This invention relates to a method for stabilizing the reaction products obtained by sulphating hydroxy compounds such as various mono- or polyhydric alcohols, partial esters, ethers or other derivatives thereof in which there remain at least one free hydroxy group, etc., by the use of sulphamic acid as the sulphating agent. The invention relates further to compositions of matter comprising reaction products of the foregoing nature which have been treated in such manner as to effect stabilization thereof, such stabilized compositions of matter being of particular importance for uses as detergents and as wetting, dispersing, emulsifying and foaming agents.

In a co-pending application, Serial No. 670,856, filed May 18, 1946 (now Patent No. 2,452,943), by Malkemus, Potter and Ross, there are described methods for sulphating monohydric and polyhydric alcohols and derivatives thereof having at least one free hydroxy group, by reaction with sulphamic acid according to which there is employed a catalyst which consists of or which contains an amide or amide-like substance such as acetamide, urea, thiourea, dicyandiamide, etc. The alcohols and alcohol derivatives used in carrying out the reaction may be any primary or secondary alcohol, such as aliphatic, alicyclic and aromatic monohydric and dihydric alcohols, glycols, glycerols, diglycerols and polyglycerols, and polyhydric alcohols in general, any alcohol or derivative of an alcohol having at least one functional alcoholic-OH group remaining in the molecule being suitable for use. The fatty acid hydroxy esters, the fatty acid hydroxy amides, and the simple fatty acid esters of polyhydric alcohols may also be used so long as at least one functional alcoholic-OH group is present in the molecule. Typical of these alcohols and alcohol derivatives are: Lauryl alcohol, methyl undecyl carbinol, cyclohexanol, methyl ricinoleate, propylene glycol monoesters of capric, lauric, myristic, coconut and stearic acids, ethylene glycol monoesters of lauric, coconut and stearic acids, diethylene glycol monostearate, glycerine derivatives such as monolaurin, monoolein, dicaprylin and dilaurin. These and other alcohols and alcohol derivatives are herein referred to by the generic terms "alcohols" and "alcohol derivatives."

According to the procedure disclosed in the aforesaid copending application, the reaction preferably is effected in the presence of a slight excess of sulphamic acid to insure complete sulphation of the hydroxy compound, and any excess sulphamic acid that might remain in the reaction product is neutralized with an alkaline material such as ammonia gas. While the process described in the aforesaid co-pending application is in general admirably suited to the production of sulphation products of the character herein contemplated, it has been found that under certain circumstances the sulphation reaction products obtained in the manner just mentioned, when dissolved in water or water-alcohol mixtures, gradually become more and more acidic due to the decomposition of certain constituents thereof, with a consequent undesirable decrease in the stability of the aqueous solutions prepared from such sulphation reaction products.

In accordance with the present invention, the foregoing and other disadvantages and difficulties encountered in connection with the preparation of sulphation products of organic hydroxy compounds by the action of sulphamic acid, whether these compounds are prepared as set forth in the aforesaid co-pending application or in accordance with any other desired procedure, are overcome by simple and economical means, whereby there are obtained sulphation products having not only excellent wetting, derging, emulsifying and foaming properties, but also excellent stability characteristics. These last mentioned characteristics are extremely important from the point of view of satisfactory commercial exploitation of sulphation reaction products of the type here under consideration.

Accordingly, one of the principal objects of the present invention is to provide new and improved methods for effecting the stabilization of sulphation reaction products obtained by the action of sulphamic acid upon organic hydroxy compounds, whether prepared by the procedure described and claimed in the foresaid co-pending application or otherwise.

Another object of the invention is to provide sulphation reaction products of the class obtained by the sulphamic acid sulphation of organic hydroxy compounds, which sulphation reaction products have been suitably treated in such manner as greatly to increase the stability thereof.

A still further object of the invention is to provide an improved class of sulphation reaction products derived from the sulphamic acid sulphation of organic hydroxy compounds, which sulphation reaction products have been suitably pretreated with reagents capable of substantially increasing the resistance to hydrolysis in aqueous solution of the said sulphation reaction products.

The manner in which these and other objects and features of the invention are attained will appear more fully from the following description thereof in which reference is made to typical and preferred procedures and examples in order to indicate more fully the nature of the invention but without intending in any way to limit the scope of the invention thereby.

It has been discovered that the sulphation reaction products obtained by reacting sulphamic acid and hydroxy compounds such as mono- and polyhydric alcohols and derivatives of such polyhydric alcohols as still contain one free hydroxy group, and with or without the presence of catalysts such as those of the amide type, as disclosed and claimed in the co-pending application of Malkemus et al. referred to above, tend when dissolved in water or water-alcohol mixtures to become gradually acidic and to decompose due to hydrolysis of the sulphate group and, when partial esters of polyhydric compounds are employed as starting materials, hydrolysis of the carboxylic ester group or groups as well.

It will be recalled that the general reaction involved in the sulphation of the alcohols or alcohol derivatives still containing at least one free hydroxyl group here under consideration proceeds as follows:

Furthermore, when the starting material consists of or contains a partial ester of a polyhydric compound, as for example a monoglyceride, then the sulphated reaction products will of course contain at least one carboxylic ester group.

The hydrolysis in water of the sulphate group and, when there is present one or more carboxylic ester groups, the hydrolysis of such groups may be regarded conveniently as proceeding as follows:

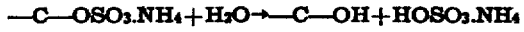

and

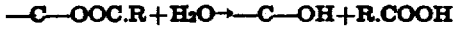

respectively.

It has been discovered that the presence of sulphamate ion in aqueous solution on the acid side (i. e., pH 7.0 or less, for example 6.0) causes such solutions progressively to become more acidic and thus further to accelerate the hydrolysis of sulphate and, when present, carboxylic ester groups. Thus, the pH of a 2% ammonium sulphamate solution dropped from 6.0 to 2.7 after standing over night at 130° F. When free sulphamic acid itself is present, this becomes hydrolyzed to $NH_4SO_4H$ at a relatively rapid rate, thus increasing the acidity of the aqueous solutions of sulphation reaction product, and "pyramiding" the deleterious effect of hydrolysis on the principal sulphation reaction product. This illustrates the importance of effecting as complete an initial destruction of sulphamate ion in the sulphation reaction product as is possible, since any sulphamate ion remaining contributes in a very undesirable manner to the instability and consequent destruction of the desired sulphation reaction product which it is the object to produce in stable form.

In accordance with the present invention, it has been discovered that the crude sulphation reaction products derived from the sulphamic acid sulphation of alcohols, or of alcohol derivatives still containing at least one free hydroxyl group, and which crude products contain sulphate groups and/or compounds having carboxylic ester groups and possibly other easily hydrolyzed compounds, may be subjected to a stabilizing treatment which includes the feature of heating the crude reaction mixture, after substantial completion of the sulphation reaction, for a substantial period of time at an elevated temperature, and under substantially anhydrous conditions, with compounds such as ammonium sulphamate, acetamide, secondary alcohols and other compounds with which sulphamic acid will react under these anhydrous conditions but which do not react with the sulphate and/or carboxylic ester groups present in the reaction mixture.

The reactions involved in effecting the desired stability appear to be as follows, having reference to the treatment of the crude sulphation reaction mixture under anhydrous conditions with ammonium sulphamate, acetamide, and a secondary alcohol, respectively:

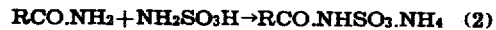
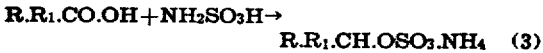

The neutralization and/or destruction of the free sulfamic present in the crude sulphation reaction product in this manner greatly increases the stability and consequently the usefulness of the latter.

To state the invention somewhat differently, the crude sulphation reaction products are stabilized by treating them with reagents (a) which will react with and/or destroy excess sulphamic acid that may be present due for example to the use of a molecular excess for the initial reaction and (b) which do not at the same time produce in the sulphation reaction products easily hydrolyzed compounds, or compounds which will affect adversely the treated sulphation reaction products having in mind their various intended uses. In short, both the stabilizing reagents and their sulphamic reaction products must be innocuous.

In order to indicate even more fully the nature of the present invention, the following examples of typical procedure are set forth, it being understood that these examples are presented as illustrative only and that they are not intended to limit the scope of the invention. The parts given are parts by weight unless otherwise indicated.

For the sake of completeness, there are first set forth hereinafter three examples (Nos. I, II and VII) taken from the aforesaid co-pending application of Malkemus et al. in order to indicate preferred procedure for obtaining in the first instance the sulphamic acid sulphation reaction products to the treatment of which the present invention is particularly applicable.

*Example A*

105 parts of sulphamic acid are suspended in 267 parts of propylene glycol monoester of coconut fatty acids, and 10 parts of dicyandiamide are added. The mixture is heated in an atmosphere of carbon dioxide to a temperature of from about 115° to 125° C. with constant stirring. The reaction product which soon begins to form remains suspended in the liquid and, as the reaction continues, a pasty, semi-solid mass is finally produced. The reaction is substantially completed in about eighty minutes, as indicated by titration of a sample of the product for free acid. The excess of sulphamic acid present in the mass is then neutralized by passing ammonia gas into the material, and there is obtained as a product a cream-colored paste which, if desired, may be dissolved in water to form a clear solution having a pH of 5.7 which foams well on agitation.

Example B 100 parts of sulphamic acid are agitated with 250 parts of coconut acid monoester of propylene glycol and 8 parts of acetamide at about 120° C. The reaction is completed in about thirty minutes, whereupon after the ammonia neutralization step a product is obtained which is quite soluble in water and which in aqueous solution foams very well when agitated.

Example C

A mixture of 200 parts methyl undecyl carbinol, 110 parts sulphamic acid and 25 parts urea was stirred at 110° C. for thirty minutes. The light tan mass obtained as a product after the ammonia neutralization step may be dissolved in water to give a clear solution which foams well on shaking.

In employing the present invention in connection with a procedure such as that described and claimed in the aforesaid copending application, and as illustrated by the foregoing examples taken therefrom, it is possible if desired to omit the step of neutralizing with ammonia gas the appreciable excess of free sulphamic acid that may be present in the final product immediately after the sulphation reaction proper is completed, for the reason that the present invention contemplates in any event the destruction of sulphamate ion remaining in the reaction mass so that by simply increasing the quantity of reagent employed herein it is possible to effect the substantial equivalent of the final ammonia treatment disclosed in the aforesaid co-pending application while at the same time substantially destroying all traces of residual sulphamic acid that might be encountered even after ammonia neutralization. However, it is generally preferred not to omit the neutralization step prior to proceeding in accordance with the present invention.

Example I 190 parts of the crude sulphation reaction product obtained as indicated above in Example A, and while still in a substantially anhydrous condition subsequent to the ammonia neutralization step, are mixed with 5 parts of ammonium sulphamate. The crude reaction product containing added ammonium sulphamate is carefully agitated in order to disperse the ammonium sulphamate therein as uniformly as possible, whereupon the mixture is heated to a temperature within the range of 100 to 150° C. and preferably of the order of 110° C., for a period of from 15 minutes to 2 hours, and preferably at least 30 minutes. During this treatment it is preferred to exclude the atmosphere by blanketing the reaction mixture with an inert gas such as carbon dioxide, although this is not necessary.

The imino di-ammonium sulphonate that is obtained as a result of the reaction between the added ammonium sulphamate and the free sulphamic acid remaining in the crude reaction product may be permitted to remain in the final product without detriment to most, if not all, uses to which that product may be put. Reaction products thus treated may be dissolved in water to form clear solutions whose pH is adjusted to about 6.0, preferably with NH$_4$OH, and which solutions foam well on agitation and which do not decompose after a storage period at room temperature of several months, after which time their pH is still about 6.0, in contrast to other portions of the same crude reaction product obtained as in Example A above, but not subjected to after-treatment with ammonium sulphamate, and in which the pH fell from 6.0 to about 2.5 within a much lesser period, namely, 30 days, of storage at room temperature. At the end of their respective storage periods, the treated product foamed substantially as well as it had when freshly prepared, whereas the non-treated product retained little of the original foaming properties.

Example II 200 parts of the crude sulphation reaction product finally obtained as set forth above under Example B, i. e., after the ammonia neutralization step, are treated with 10 parts of acetamide, the added acetamide being thoroughly and uniformly dispersed throughout the crude reaction mixture by suitable agitation. The crude reaction mixture containing added acetamide is then heated to a temperature to the order of 110° C. for a period of approximately one hour under substantially anhydrous conditions, this treatment being performed in an atmosphere of inert gas, such as nitrogen. The product produced by reaction between the acetamide and residual sulphamic acid is permitted to remain in the final product.

The sulphamic acid sulphation product stabilized in the manner indicated is quite soluble in water and foams well on agitation. Furthermore, it retains those characteristics over a much longer period of time than does a reaction product similarly prepared except that it is not after-treated with acetamide. A solution of the after-treated sulphamic acid reaction product retains its original foaming properties, as well as the pH value of 6.0 in which it had originally been made up, for 3 months, as contrasted to a solution of the non-after-treated reaction product, the pH of which falls from 6.0 to 2.5 after only 30 days, and which foams very poorly. Both samples are stored at room temperature.

Example III 10 parts of the secondary alcohol, methyl isobutyl carbinol, are thoroughly dispersed in 200 parts of the crude sulphation reaction product obtained according to the procedure set forth under Example C above. The resulting mixture is heated under anhydrous conditions and in an atmosphere of nitrogen at a temperature of approximately 110° C., the heating being continued for a period of 40 minutes. The methyl isobutyl carbinol ammonium sulphate obtained as a result of reaction between the added methyl isobutyl carbinol and residual sulphamic acid present in the crude sulphation reaction product of Example C is permitted to remain therein.

The sulphation reaction product, after the stabilization treatment in the manner just indicated, is found to retain over an unusually long period of time its superior foaming and wetting properties. After being made up in aqueous alcohol solution to an initial pH of 6.0, the solution containing 400 parts of water and 100 parts of ethyl alcohol, it is found that there is no appreciable lowering of the pH of the solution even after a storage period of 60 days at room temperature, thus indicating a product of greatly enhanced stability over a product otherwise identical but without the stabilizing treatment.

While the present invention thus far has been described in connection with an after-treatment of a sulphation reaction product obtained by the sulphamic acid sulphation of alcohols and derivatives thereof still containing at least one free hydroxyl group, with compounds which will react with any residual sulphamic acid remaining in the initial reaction product, such as ammonium sulphamate, acetamide, and a secondary alcohol such as methyl isobutyl carbinol, it will be understood that these are mentioned merely by way of example and that many other compounds may be employed in generally similar manner. For example, instead of acetamide there may be employed other amides and amide derivatives having at least one replaceable hydrogen atom attached to a nitrogen atom, such as propionamide, butyramide, benzamide, urea, thiourea, etc. In place of methyl isobutyl carbinol other secondary alcohols, either on both of whose alkyl groups may be short-chain or long-chain, may be employed, such as methyl amyl carbinol, ethyl pentadecyl carbinol, methyl heptadecyl carbinol, etc. However, the secondary alcohol should be one having a boiling point at least as high as the temperature at which the stabilizing treatment is carried out, and preferably one having a boiling point that is approximately ten degrees higher. An alcohol whose boiling point is in excess of approximately 130° C. is ordinarily preferred.

In general the stabilizing treatment is carried out by heating the crude sulphation reaction product, to which the stabilizing treating reagent has been added, to an elevated temperature under anhydrous conditions to promote the conversion or destruction of excess sulphamic acid; temperatures in the range of about 100° to 150° C., and preferably in the range of about 110° to 125 C., being advantageously employed.

The quantity of stabilizing reagent to be employed may vary over wide ranges, considerable latitude in this respect being possible. From 2 to 10 per cent, based on the weight of crude sulphation reaction product treated, represents preferred practice, although more or less may be employed without losing all the benefits of the invention. In the case of ammonium sulphamate as treating agent it is generally worthwhile to exercise more care to avoid the use of too great an excess, thereby avoiding the danger of leaving any substantial quantity of sulphamate material in the final treated product. When using ammonium sulphamate, or indeed any of the other treating agents, the skilled chemist can readily determine the optimum quantity representing preferred procedure, by simply making one or a few trial runs upon small aliquots of the main batch to be treated and, from the results thereof, determining whether to increase or decrease the proportion of treating agent to be employed.

The stabilized sulfation products produced in accordance with the present invention possess extremely useful surface active properties and may be employed as detergents, wetting agents, foaming agents, emulsifiers, or as dispersing agents. These products may be used by themselves or with other detergents, fillers, and the like in the form of cakes, bars, beads, flakes, chips, pastes, or liquids. They are useful as shampoos, dental detergents and for washing or cleaning purposes. They may also be used in dyeing processes, as dispersing agents in oil and water paints, fungicides, and similar compositions. They are excellent emulsifiers for use in cosmetics, waxes, polishes and in ore flotation processes, and may be used as demulsifiers for water-in-oil petroleum emulsions. They are also useful in lubricants and may be employed as anti-splattering agents for cooking fats. Many other applications will occur to those skilled in the art.

In general, the stabilized products are light-colored, pasty compositions which are largely soluble in water. They are non-toxic and non-irritating to the skin, and do not have a pronounced odor.

While various specific examples of preferred compositions and methods embodying the present invention have been described above, it will be apparent that many changes and modifications may be made in the methods of procedure, and that a wide variety of specific reagents may be employed in carrying out the procedure. It should therefore be understood that the examples cited and the particular proportions and methods of procedure set forth above are intended to be illustrative only, and are not intended to limit the scope of the invention.

What is claimed is:

1. A method for stabilizing a sulphated product formed by reacting (a) sulphamic acid with (b) an organic compound consisting of C, H and O atoms and containing at least one functional group selected from the class consisting of ethers, carboxylic acid esters and alcohols, said organic compound containing at least one alcoholic-OH group capable of sulphation, there being present in the said organic compound no oxygen other than in the form of ethereal oxygen, carboxylic acid ester oxygen or alcoholic oxygen, said sulphated product containing residual sulphamic acid, which comprises heating said sulphated product with a reagent capable of destroying the residual sulphamic acid contained therein.

2. A method as defined in claim 1 wherein the reagent is ammonium sulphamate.

3. A method as defined in claim 1 wherein the reagent is an amide.

4. A method as defined in claim 1 wherein the reagent is acetamide.

5. A method as defined in claim 1 wherein the reagent is a secondary alcohol.

6. A method as defined in claim 1 wherein the reagent is a secondary alcohol whose boiling point is at least 130° C.

7. A method for stabilizing a sulphated product formed by reacting (a) sulphamic acid with (b) an organic compound consisting of C, H and O atoms and containing at least one functional group selected from the class consisting of ethers, carboxylic acid esters and alcohols, said organic compound containing at least one alcoholic-OH group capable of sulphation, there being present in the said organic compound no oxygen other than in the form of ethereal oxygen, carboxylic acid ester oxygen or alcoholic oxygen, said sulphated product containing residual sulphamic acid, which comprises heating said sulphated product under anhydrous conditions and at an elevated temperature with a reagent capable of destroying the residual sulphamic acid contained therein.

8. A method as defined in claim 7 wherein the reagent is ammonium sulphamate.

9. A method as defined in claim 7 wherein the reagent is an amide.

10. A method as defined in claim 7 wherein the reagent is acetamide.

11. A method as defined in claim 7 wherein the reagent is a secondary alcohol.

12. A method as defined in claim 7 wherein the reagent is a secondary alcohol whose boiling point is at least 130° C.

13. The process of stabilizing a sulphate ester formed by the reaction of (a) sulphamic acid and (b) an organic compound consisting of C, H and O atoms and containing at least one functional group selected from the class consisting of ethers, carboxylic acid esters and alcohols, said organic compound containing at least one alcoholic-OH group capable of sulphation, there being present in the said organic compound no oxygen other than in the form of ethereal oxygen, carboxylic acid ester oxygen or alcoholic oxygen, said sulphate ester containing residual sulphamic acid, which comprises adding a stabilizing agent comprising a compound which reacts with said residual sulphamic acid to form a difficultly hydrolizable compound and heating the mixture until said residual sulphamic acid has reacted therewith.

JOHN RANDOLPH CLARK.
JOHN DAVID MALKEMUS.

REFERENCES CITED

The following references are of record in the file of this patent:

UNITED STATES PATENTS

| Number | Name | Date |
|---|---|---|
| 2,326,270 | Werntz | Aug. 10, 1943 |

FOREIGN PATENTS

| Number | Country | Date |
|---|---|---|
| 382,942 | Great Britain | 1932 |

OTHER REFERENCES

Ephraim, "Organic Chemistry" (4th ed., rev. by Thorne and Roberts, 1943), page 642.

Karrer, "Organic Chemistry" (2nd English ed., 1946), pp. 126 and 211.